(12) United States Patent
McClatchie

(10) Patent No.: US 9,300,872 B2
(45) Date of Patent: Mar. 29, 2016

(54) HYBRID STABILIZER WITH OPTIMIZED RESONANT AND CONTROL LOOP FREQUENCIES

(71) Applicant: TOLO, INC., Los Altos, CA (US)

(72) Inventor: Iain Richard Tyrone McClatchie, Los Altos, CA (US)

(73) Assignee: Tolo, Inc., Los Altos, CA (US)

( * ) Notice: Subject to any disclaimer, the term of this patent is extended or adjusted under 35 U.S.C. 154(b) by 174 days.

(21) Appl. No.: 14/159,360

(22) Filed: Jan. 20, 2014

(65) Prior Publication Data

US 2015/0264262 A1    Sep. 17, 2015

Related U.S. Application Data

(60) Provisional application No. 61/791,377, filed on Mar. 15, 2013.

(51) Int. Cl.
*H04N 5/225* (2006.01)
*H04N 5/232* (2006.01)
*G02B 27/64* (2006.01)

(52) U.S. Cl.
CPC .......... *H04N 5/23248* (2013.01); *G02B 27/644* (2013.01)

(58) Field of Classification Search
USPC ......................................... 348/373
See application file for complete search history.

(56) References Cited

U.S. PATENT DOCUMENTS

| 4,796,873 | A | * | 1/1989 | Schubert | 267/136 |
| 5,752,834 | A | * | 5/1998 | Ling | 434/58 |
| 2005/0256613 | A1 | * | 11/2005 | Zuo et al. | 700/280 |
| 2014/0340427 | A1 | * | 11/2014 | Baker | 345/641 |

* cited by examiner

*Primary Examiner* — Roberto Velez
*Assistant Examiner* — Stephen Coleman
(74) *Attorney, Agent, or Firm* — PatentVentures: Bennett Smith; Korbin Van Dyke

(57) ABSTRACT

A hybrid stabilizer isolates a payload from vibrations across six degrees of freedom using an underdamped passive stabilizer in series with an active stabilizer that is mounted to the foundation, thereby improving isolation. In a first aspect, the passive stabilizer is one or more underdamped springs that reduce high frequency vibrations and in some embodiments the passive stabilizer is tuned to a resonant frequency at most half the control loop frequency of the active stabilizer. The active stabilizer is a six-axis motion platform that reduces or eliminates low frequency vibrations, particularly around the resonant frequency of the passive stabilizer. In a second aspect, the hybrid stabilizer isolates one or more cameras and is mounted to a vehicle, reducing motion blur and improving camera tracking, thereby enhancing the quality of images captured by the cameras.

18 Claims, 3 Drawing Sheets

HYBRID STABILIZER WITH OPTIMIZED RESONANT AND CONTROL LOOP FREQUENCIES

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application Ser. No. 61/791,377, filed Mar. 15, 2013, first named inventor Iain Richard Tyrone MCCLATCHIE, and entitled HYBRID STABILIZER WITH OPTIMIZED RESONANT AND CONTROL LOOP FREQUENCIES.

BACKGROUND

1. Field

Advancements in mechanical isolation are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

An example of a camera is an image capturing system that captures imagery using a lens that focuses light on at least one Petzval surface (e.g. a focal plane), and captures an image with at least one image sensor on the Petzval surface. A focal plane is an example of a planar Petzval surface. In general, Petzval surfaces are not required to be planar and may be curved due to the design of the lens. Examples of image sensors include film and electronic image sensors. Examples of electronic image sensors include Charge Coupled Device (CCD) sensors and Complementary Metal-Oxide Semiconductor (CMOS) sensors. An example of an emerging optical axis of a camera is the path along which light travels from the ground at the center of the lens field of view to arrive at the entrance to the camera. The light path inside the camera may be folded with reflecting surfaces, but eventually light arriving along the emerging optical axis will converge at the center of the Petzval surface(s).

Some maps assume a camera perspective looking straight down, called an orthographic (or nadir) perspective. In some scenarios, this is also the perspective of the captured images used to make these maps (e.g. orthographic imagery). However, orthographic imagery eliminates all information about the relative heights of objects, and information about some surfaces (e.g. the vertical face of a building).

Other maps assume a camera perspective looking down at an angle below the horizon but not straight down, called an oblique perspective. An example of a down angle of a camera is the angle of the emerging optical axis of the camera above or below the horizon; down angles for nadir perspectives are thus 90 degrees; down angles for oblique perspectives are usually 20 to 70 degrees. Sometimes, the camera used to capture an oblique perspective is referred to as an oblique camera and the resulting images are referred to as oblique imagery. In some scenarios, oblique imagery is beneficial because it presents information that is useful to easily recognize objects and/or locations (e.g. height and vertical surfaces); information that is typically missing from orthographic imagery.

An example of ground-centric oblique image collection is capturing the same point on the ground in multiple oblique images from multiple perspectives (e.g., 4 perspectives looking at a building, one from each cardinal direction: North, South, East, and West). Ground-centric collection yields ground-centric oblique imagery. In various scenarios, ground-centric aerial oblique imagery is useful, e.g. for assessing the value of or damage to property, particularly over large geographic areas. It is usually a priority in a ground-centric collection program to collect an image of every point in some defined target area for each of the cardinal directions. The capture resolution is measured in distance units on the ground (e.g., 4 inch per pixel) and usually does not vary much between different points in the target area.

An example of a strip of oblique and/or nadir imagery is a sequence of individual oblique and/or nadir images. In some scenarios, sequential images overlap (e.g., by 50-60%) to ensure that each point on the ground is captured at least twice (e.g. for stereopsis). To capture an entire region, multiples strips are collected and then stitched together. Typically, portions of the strips are discarded (e.g. jagged edges) to ensure a smooth fit.

An example of sky-centric collection is capturing multiple oblique images from a single point, with multiple perspectives (e.g., 4 perspectives looking from a building in each cardinal direction), also known as sky-centric collection. In some scenarios, sky-centric imagery is commonly used to form a panoramic view from a single point. It is usually a priority in a sky-centric collection program to collect a continuous panorama from each viewpoint. Capture resolution is usually measured in angular units at the viewpoint (e.g., 20,000 pixels across a 360 degree panorama).

An example of a camera-group is a system of one or more cameras that approximately capture the same image (e.g. the optical axes are aligned within 5 degrees of a common reference axis). For example, an ordinary pair of human eyes acts as a 2 camera-group, focusing on a single image. Generally, a camera-group can have an arbitrary number of cameras.

An example of a camera-set is a system of one or more cameras and/or camera-groups that capture different images. One example of a 2 camera-set is a nadir camera and an oblique camera. Another example of a 4 camera-set is 4 oblique cameras, each pointing in a different cardinal direction. Generally, a camera-set can have an arbitrary number of cameras and/or camera-groups.

An example of the nominal heading of a vehicle is the overall direction of travel of the vehicle. In many scenarios, the instantaneous direction of travel deviates from the nominal heading. For example, an airplane may be flying along a flightpath heading due north, so that the nominal heading is north, while experiencing a wind blowing from west to east. To keep the plane on the flight path, the pilot will point the plane into the wind, so that the instantaneous heading is many degrees west of north. As another example, a car is driving down a straight road that runs from south to north and has several lanes. The nominal heading is north. However, to avoid hitting an obstacle, the car may changes lanes, instantaneously moving northwest, rather than strictly north. Despite this instantaneous adjustment, the nominal heading is still north. In contrast, when the car turns 90 degrees from north to travel west, the nominal heading is now west.

The motion of a vehicle collecting oblique and/or nadir imagery poses significant challenges to collecting high quality imagery; in some scenarios motion or vibrations from the vehicle couple to the camera (or collectively the camera-set) while it captures images, causing blurring or other artifacts. Some vehicles, such as planes, move freely throughout three dimensions of space (sometimes referred to as linear motion or translation, e.g. forward/back, up/down, and left/right) as well as three dimensions of rotation (sometimes referred to as angular motion or rotation, e.g. yaw, roll, and pitch).

In some scenarios, crosswinds cause significant yaw, which alters the angles of the emerging optical axis of the camera and changes the captured image. Sufficiently large crosswinds could cause the camera to miss portions of the intended target (e.g. a portion of a strip on the ground). In other scenarios, pitch and roll cause motion blur, which forces shorter exposure times and decreases the sensitivity of the camera. For cameras that use an array of multiple sensors, roll can cause the camera to miss portions of the ground.

In various scenarios, linear motion along the nominal heading causes motion blur. In other scenarios, linear acceleration cause one or more cameras to flex, which disturbs the relative emerging optical axes of the different cameras in a camera-set and in extreme cases could cause the mirrors to sag and change focus.

In some scenarios, vibration is problematic because it represents a combination of linear and angular motion. Vehicles have a number of sources of vibration, which can couple into the camera and cause various problems as outlined above.

An example of a stabilizer is a device that isolates a payload (e.g., a camera, a robot, a drill, etc.) from linear and/or angular motion (e.g., shock and vibration). One type of stabilizer is a passive stabilizer (e.g., a spring and/or dashpot), where the behavior of the stabilizer is primarily determined by the materials and structure. Some passive stabilizers are critically damped; in response to a shock, the stabilizer will converge to the original position with a single overshoot in the shortest amount of time possible. Other passive stabilizers are overdamped; in response to a shock, the stabilizer will return the payload to the original position without overshoot over a relatively longer period of time. Yet other passive stabilizers are underdamped; in response to a shock, the stabilizer will oscillate the payload around the original position with exponentially decaying amplitude and eventually converging to the original point. This oscillation will happen at the resonant frequency of the isolated payload. An underdamped stabilizer will more strongly attenuate high frequency vibrations, but certain low frequency vibrations (e.g., at the resonant frequency of the system) are transmitted more strongly. All passively stabilized systems have a resonant frequency (even critically damped and overdamped systems), which can typically be tuned by varying the spring rate, mass, or damping factor.

Another type of stabilizer is an active stabilizer (e.g., an actuator, a sensor, and a control system), where behavior of the stabilizer is primarily determined by an electronic control system and limited by the measurement and actuation systems. The electronic control system measures variables of the stabilizer and payload via sensors (e.g. accelerometers), and based upon these measurements (and potentially other factors) decides the motion of the stabilizer. The frequency of decision-making by the electronic control system is sometimes known as the control loop frequency. Different sensors are sampled at different rates, some are sampled faster than the control loop frequency (e.g., for variables that change rapidly), while others are sampled slower than the control loop frequency (e.g., for variables that change slowly, such as the temperature of the sensors).

One of the limitations of an active stabilizer is the control loop frequency, which governs the ability of the active stabilizer to respond to external stimuli. Specifically, an active stabilizer cannot effectively isolate vibrations that are faster (e.g., higher frequency) than half the control loop frequency (sometimes called the Nyquist frequency). For example, an active stabilizer with a 100 Hz control loop frequency will perform best at isolating vibrations below 5 Hz. However, at frequencies substantially lower than the Nyquist frequency, active stabilizers are highly effective because of the adaptive and non-linear nature of the system.

An example of transmissibility of a stabilizer is the ratio between the amplitude of an input vibration and the amplitude of the resulting output vibration. Conceptually, transmissibility is a measure of the attenuation for a given frequency of vibration. For example, when a stabilizer receives a 10 Hz vibration with amplitude 2 mm, but the payload only receives a vibration with amplitude 0.2 mm, the transmissibility is 0.1. Generally, the lower the transmissibility, the better a stabilizer is at isolating the payload.

In some scenarios, stabilizers are used to isolate cameras from linear and angular motion, thereby improving image quality. For example, consumers and professional photographers commonly use Steadicams (a type of passive stabilizer) to reduce motion (e.g. from the unstable photographer's hands) and produce higher quality photos and videos; the same principal applies to cameras mounted on vehicles. In other scenarios, cameras are stabilized with active stabilizers, for example the Skycam used to record and televise many sporting events.

An example of an Inertial Measurement Unit (IMU) is an electronic device that measures characteristics of an object such as linear acceleration, angular velocity, and magnetic flux field.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

In one embodiment, a hybrid stabilizer system comprising a passive stabilizer stage and an active stabilizer stage is mounted to a foundation (e.g. an airplane) and isolates a payload (e.g. one or more cameras) from vibration across six degrees of freedom. An underdamped passive stabilizer stage isolates the cameras from high frequency vibrations and is tuned to have a resonant frequency that is substantially lower than the control loop frequency of the active stabilizer (e.g., in some embodiments the resonant frequency is at most 50% of the control loop frequency, at most 10% in other embodiments). The active stabilizer isolates the passively stabilized cameras and is mounted to the plane. The active stabilizer reduces or eliminates low frequency vibrations, particularly around the resonant frequency of the passive stabilizer. The combined hybrid stabilizer system achieves superior isolation (e.g., in some embodiments reducing vibration amplitude at the payload by 0.1× compared to the vibration amplitude at the foundation, around the resonant frequency), thereby improving the image quality of the stabilized cameras.

DETAILED DESCRIPTION

Figure 1:
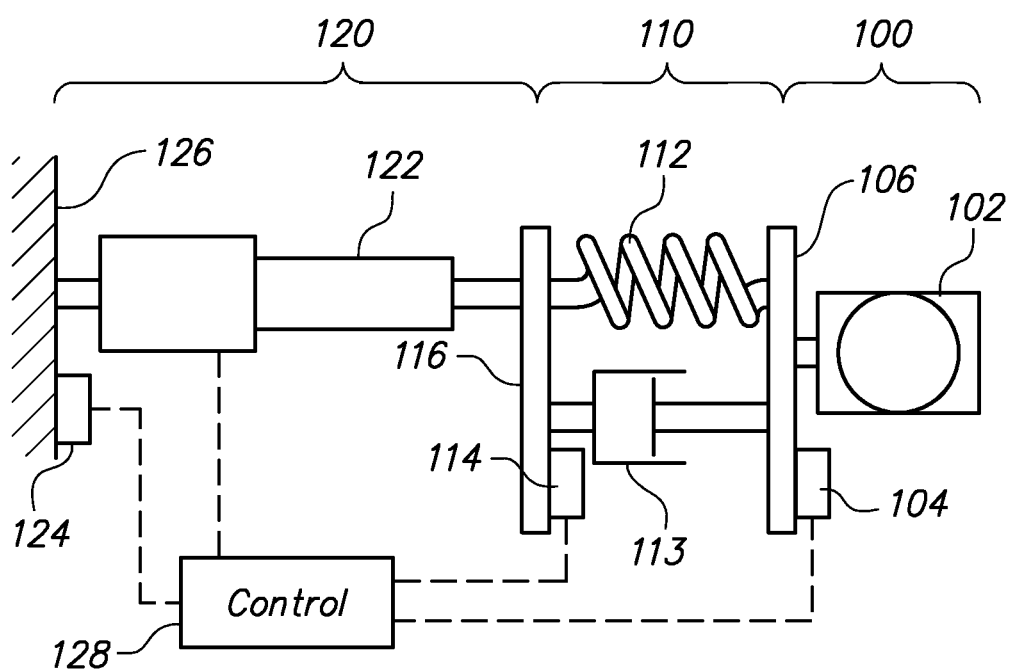
FIG. 1 conceptually illustrates selected details of an embodiment of a one dimensional hybrid stabilizer system that couples a payload to a foundation.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

A hybrid stabilizer isolates a payload from vibrations across six degrees of freedom using an underdamped passive stabilizer in series with an active stabilizer that is mounted to the foundation, thereby improving isolation. In a first aspect, the passive stabilizer is one or more underdamped springs that reduce high frequency vibrations and in some embodiments the passive stabilizer is tuned to a resonant frequency at most half the control loop frequency of the active stabilizer. The active stabilizer is a six-axis motion platform that reduces or eliminates low frequency vibrations, particularly around the resonant frequency of the passive stabilizer. In a second aspect, the hybrid stabilizer isolates one or more cameras and is mounted to a vehicle, reducing motion blur and improving camera tracking, thereby enhancing the quality of images captured by the cameras.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
  passively isolating a payload from an intermediate frame, where the passively isolated payload has a selected resonant frequency;
  actively isolating the intermediate frame from a foundation; and
  controlling the actively isolating via a control system with a control loop frequency, where the selected resonant frequency is selected to be less than half the control loop frequency.

EC2) The method of EC1 wherein the payload comprises a camera.

EC3) The method of EC1 wherein the passively isolating is performed by one or more underdamped springs.

EC4) The method of EC1 wherein the actively isolating is performed by a six-axis motion platform.

EC5) The method of EC4 wherein the six-axis motion platform comprises multiple actuators.

EC6) The method of EC5 wherein the multiple actuators comprise at least one linear actuator.

EC7) The method of EC6 wherein the at least one linear actuator is a lead-screw-type actuator.

EC8) The method of EC5 wherein the multiple actuators comprise six actuators.

EC9) The method of EC1 wherein the foundation comprises a vehicle.

EC10) The method of EC9 wherein the vehicle is one or more of: an aircraft, an airplane, a lighter-than-air craft, a space-craft, a helicopter, a satellite, a car, a truck, a land-based vehicle, a ship, a boat, a barge, a canoe, a submersible, and a submarine.

EC11) The method of EC9 wherein the vehicle is manned or unmanned.

EC12) The method of EC1 wherein the controlling comprises measuring characteristics of one or more of the payload, the intermediate frame, and the foundation.

EC13) The method of EC12 wherein the characteristics comprise one or more of linear acceleration, angular rotation rate, magnetic flux direction, air pressure, temperature, GPS location and carrier phase of one or more GPS antennae.

EC14) The method of EC13 wherein the payload comprises a camera enabled to capture images and the characteristics of the camera further comprise motion vectors extracted from images captured by the camera.

EC15) The method of EC1 wherein the controlling comprises feed-forward and feed-back control.

EC16) The methods of EC12 wherein the controlling further comprises adjusting the actively isolating based at least in part upon some result of the measuring.

EC17) The method of EC16 and EC5 wherein the adjusting comprises adjusting the position of at least one of the multiple actuators of the six-axis motion platform.

EC18) The method of EC12 wherein the measuring is performed by an IMU.

EC19) The method of EC12 wherein the measuring is performed by a GPS unit and one or more GPS antennae.

FIG. 1 conceptually illustrates selected details of an embodiment of a one dimensional hybrid stabilizer system that couples a payload to a foundation. The hybrid stabilizer system is a two-stage stabilizer; the first stage is a passive viscous damping stabilizer and the second stage is an active stabilizer. Payload 100 is comprised of Camera 102, Payload Frame 106, and Payload IMU 104. Camera 102 is supported by Payload Frame 106. Payload IMU 104 is attached to Payload Frame 106 and measures a variety of Payload Frame variables including linear acceleration, angular velocity, and magnetic flux field. Passive Stabilizer 110 connects Payload Frame 106 to Intermediate Frame 116. Passive Stabilizer 110 is a viscous damping stabilizer comprising Spring 112 and Dashpot 113, mounted to Intermediate Frame 116. Intermediate IMU 114 is attached to Intermediate Frame 116 and measures a variety of Intermediate Frame characteristics including linear acceleration, angular velocity, and magnetic flux field. Active Stabilizer 1210 connects Intermediate Frame 116 to Foundation 126 via Linear Actuator 122. In various embodiments, Foundation 126 is a vehicle (e.g. an airplane, a satellite, a car, a ship); in some scenarios the vehicle is a manned vehicle, while in others it is an unmanned vehicle. Foundation IMU 124 is attached to Foundation 126 and measures a variety of Foundation characteristics including linear acceleration, angular velocity, orientation, and magnetic flux field. Control 128 receives measurements from Payload IMU 104, Intermediate IMU 114, Foundation IMU 124, and other sources and controls Active Stabilizer 120 (e.g., via Linear Actuator 122) to isolate Payload 100.

Passive Stabilizer 110 of FIG. 1 is an underdamped system. Spring 112 and Dashpot 113 act as a passive damper that isolates Camera 102 from high frequency vibration, conceptually acting as a low-pass filter. In various embodiments, other viscous damping systems are used to stabilize Payload 100, rather than Spring 112 and Dashpot 113.

Active Stabilizer 120 of FIG. 1 comprises Linear Actuator 122 and is driven by Control 128 that dynamically adjusts the position of Linear Actuator 122 by manipulating its acceleration to isolate Passive Stabilizer 110 and Payload 100. In various embodiments, Linear Actuator 122 is a lead-screw-type linear actuator. In some embodiments, rotational actuators and tie rods are used rather than linear actuators. Since linear actuators are typically limited by the rotational inertia of the motor and the inertia of the load, the active stabilizer conceptually acts as a high-pass filter.

The relationship between the control frequency of Active Stabilizer 120 and the resonant frequency of Passive Stabilizer 110 determine the overall operation of the hybrid stabilizer system. Passive Stabilizer 110 is tuned (e.g. underdamped) to significantly reduce high frequency vibrations. The resonant frequency of Passive Stabilizer 110 is chosen to be substantially lower than the control loop frequency of Active Stabilizer 120 (e.g., in some embodiments the resonant frequency is at most 50% of the control loop frequency, at most 10% in other embodiments). As a result, the active stabilizer can easily reduce or eliminate the vibrations around the resonant frequency of the passive system. For example, in some embodiments the resonant frequency of Passive Stabilizer 110 is tuned to 5 Hz and the control loop frequency of Active Stabilizer 120 is 100 Hz.

Figure 2:
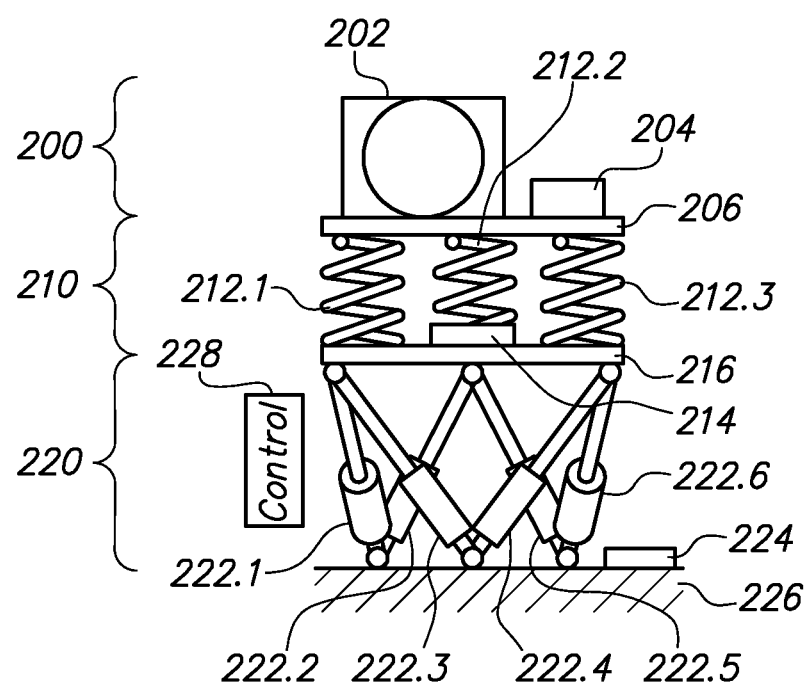
FIG. 2 conceptually illustrates selected details of an embodiment of a three dimensional hybrid stabilizer system that couples a payload to a foundation.

FIG. 2 conceptually illustrates selected details of an embodiment of a three dimensional hybrid stabilizer system that couples a payload to a foundation. The hybrid stabilizer system is a three dimensional version of the two-stage stabilizer of FIG. 1. Payload 200 is comprised of Camera 202, Payload Frame 206, and Payload IMU 204. Camera 202 is supported by Payload Frame 206. Payload IMU 204 is attached to Payload Frame 206 and measures a variety of Payload Frame characteristics including linear acceleration, angular velocity, and magnetic flux field. Passive Stabilizer 210 connects Payload Frame 206 to Intermediate Frame 216. Passive Stabilizer 210 is a viscous damping stabilizer comprising Helical Springs 212.1, 212.2, and 212.3 (collectively Helical Springs 212). In various embodiments, Helical Springs 212 are arranged in a pattern that will resist linear and rotational motion in all six degrees of freedom with approximately equal resonant frequencies. In some embodiments, Helical Springs 212 are mounted in a dampening material, such as a synthetic viscoelastic urethane polymer, such as Sorbothane™. Intermediate IMU 214 is attached to Intermediate Frame 216 and measures a variety of Intermediate Frame characteristics including linear acceleration, angular velocity, and magnetic flux field. Active Stabilizer 220 connects Intermediate Frame 216 to Foundation 226. In various embodiments, Foundation 226 is a vehicle (e.g. an airplane, a satellite, a car, a ship); in some scenarios the vehicle is a manned vehicle, while in others it is an unmanned vehicle. Active Stabilizer 220 is a six-axis motion platform (such as a so-called Stewart platform) comprising Linear Actuators 222.1, 222.2, 222.3, 222.4, 222.5, and 222.6 (collectively Linear Actuators 222). In various embodiments, the motion platform comprises rotational actuators, rather than Linear Actuators 222. Foundation IMU 224 is attached to Foundation 226 and measures a variety of Foundation variables including linear acceleration, angular velocity, orientation, and magnetic flux field. Control 228 receives measurements from Payload IMU 204, Intermediate IMU 214, Foundation IMU 224, and other sources and controls Active Stabilizer 220 (e.g., the six-axis motion platform) to isolate Payload 200 and Passive Stabilizer 210. For clarity, the inputs to Control 228 (e.g., measurements from IMUs) and the outputs from Control 228 (e.g., to Linear Actuators 222) are not shown.

In various embodiments, Foundation 226 is a vehicle and it carries multiple payloads and hybrid stabilizers. For example, a plane carrying four hybrid stabilized oblique cameras and a hybrid stabilized nadir camera. Typically, a camera carried on a vehicle such as a plane is pointed out of a window; as a result changes in orientation or position can significantly occlude the camera. The camera will often sag and/or lean, due to subtle imperfections in Payload Frame 206 and/or Passive Stabilizer 210. Moreover, the center of gravity of a camera is typically far away from the window which can exacerbate occlusion due to angular motion. Active Stabilizer 220 corrects both of these problems, thereby improving image collection quality.

The three dimensional hybrid stabilizer differs from the one dimensional version in various ways. In some embodiments, the different linear and angular degrees of freedom are loosely coupled because Payload 200 is not entirely symmetric (e.g., the inertia tensor has non-diagonal non-zero elements). As a result, vibration along any one degree of freedom will tend to stimulate vibration along the other degrees of freedom. So Passive Stabilizer 210 handles all six degrees of freedom similarly to the one dimensional case, e.g., in some embodiments each resonant frequency is at most half the control loop frequency (in other embodiments each resonant frequency is less than a tenth of the control loop frequency).

Figure 3:
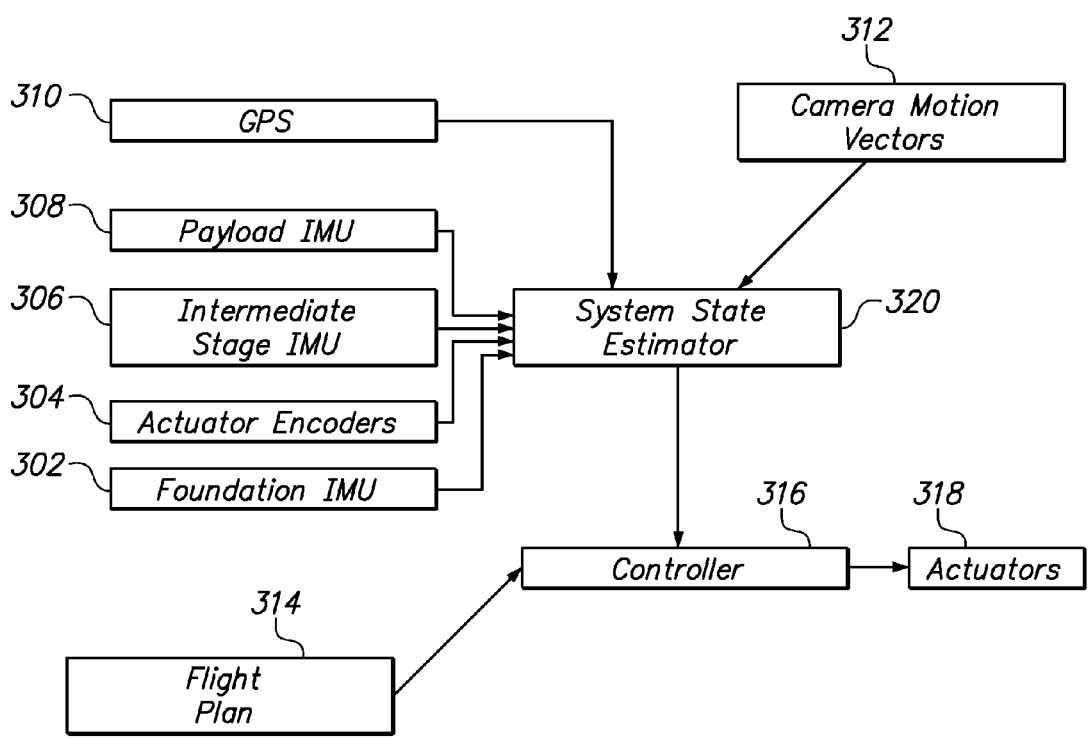
FIG. 3 conceptually illustrates selected details of an embodiment of a control and measurement system for a hybrid stabilizer.

FIG. 3 conceptually illustrates selected details of an embodiment of a control and measurement system for a hybrid stabilizer. Foundation IMU 302, Intermediate IMU 306, and Payload IMU 308 measure linear acceleration, angular velocity, orientation, and magnetic flux field for the respective components from FIG. 2. Actuator Encoders 304 measure the position of the Linear Actuators from FIG. 2. A GPS Unit 310 with one or more antennae measures GPS trajectories and/or GPS carrier phase at the antenna locations (antenna locations are typically located on the foundation). Camera Motion Vectors 312 measure optical flow, which is used by System State Estimator 320 to infer information about the foundation (e.g., rotation, velocity of a vehicle). Note that Camera Motion Vectors 312 can be more precise and/or more frequently updated than the IMUs for determining rotation. In various embodiments, other measurements are sampled.

Measurement data is sampled at various sensors and fed into System State Estimator 320, which estimates the state of the stabilizer system (e.g., sensor temperature, orientation of the different stabilizer stages, nominal heading of the foundation, etc.). Examples of System State Estimator 320 include Kalman filters, particle filters, and other techniques. In various embodiments System State Estimator 320 is implemented in hardware, software, firmware, or any combination thereof. In some embodiments, multiple Kalman filters are used (potentially on different computers). Based on System State Estimator 320 estimations and Flight Plan 314, Controller 316 determines how to position the camera payload(s). In various embodiments, Controller 316 is implemented in hardware, software, firmware, or any combination thereof.

In some embodiments, when Flight Plan 314 indicates that the vehicle will be moving such that the hybrid stabilizer will be unable to isolate the payloads (e.g., due to a sharp turn), Controller 316 pre-emptively will position the payloads to minimize any shock. Otherwise, Controller 316 will attempt to isolate the payloads and send the appropriate commands to Actuators 318 (e.g., Linear Actuators 222 in FIG. 2). One advantage of this technique is that it reduces the physical strain and stress on the payload by avoiding shocks due to turning, which is desirable for fragile or sensitive payloads (e.g. cameras).

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. The order and arrangement of flowchart and flow diagram process, action, and function elements are variable according to various embodiments. Also, unless specifically stated to the contrary, value ranges specified, maximum and minimum values used, or other particular specifications (such as number and configuration of actuators, underdamped springs, measured variables of the payload, resonant frequencies, control frequencies, intermediate frame and foundation, etc.), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other mechanical stabilization, imaging, survey, surveillance, and photogrammetry applications, and are not limited to the particular application or industry of the described embodiments. The invention is thus to be construed as including all possible modifications and variations encompassed within the scope of the claims of the issued patent.

What is claimed is:
1. A method comprising:
passively isolating a payload from an intermediate frame, wherein the passively isolated payload has a selected resonant frequency;
actively isolating the intermediate frame from a foundation;

controlling the actively isolating via a control system with a control loop frequency, wherein the selected resonant frequency is selected to be less than half the control loop frequency;

wherein the controlling comprises measuring characteristics of one or more of the payload, the intermediate frame, and the foundation; and wherein the characteristics comprise one or more of linear acceleration, angular rotation rate, magnetic flux direction, air pressure, temperature, and GPS location and GPS carrier phase of one or more GPS antennae.

2. The method of claim 1, wherein the payload comprises a camera.

3. The method of claim 1, wherein the passively isolating is performed by one or more underdamped springs.

4. The method of claim 1, wherein the payload comprises a camera enabled to capture images and the characteristics of the camera further comprise motion vectors extracted from images captured by the camera.

5. The method of claim 1, wherein the controlling further comprises feed-forward and feed-back control.

6. The method of claim 1, wherein the measuring is performed by an IMU.

7. The method of claim 1, wherein the measuring is performed by a GPS unit and one or more GPS antennae.

8. The method of claim 1, wherein the controlling further comprises adjusting the actively isolating based at least in part upon the measuring.

9. The method of claim 8, wherein the actively isolating is performed by a Stewart platform comprising multiple actuators and the adjusting comprises adjusting the position of at least one of the multiple actuators.

10. The method of claim 1, wherein the foundation comprises a vehicle.

11. The method of claim 10, wherein the vehicle is one or more of: an aircraft, an airplane, a lighter-than-air craft, a space-craft, a helicopter, a satellite, a car, a truck, a land-based vehicle, a ship, a boat, a barge, a canoe, a submersible, and a submarine.

12. The method of claim 10, wherein the vehicle is manned or unmanned.

13. The method of claim 1, wherein the actively isolating is performed by a six-axis motion platform.

14. The method of claim 13, wherein the six-axis motion platform comprises multiple actuators.

15. The method of claim 14, wherein the multiple actuators comprise six actuators.

16. The method of claim 14, wherein the adjusting comprises adjusting the position of at least one of the multiple actuators of the six-axis motion platform.

17. The method of claim 14, wherein the multiple actuators comprise at least one linear actuator.

18. The method of claim 17, wherein the at least one linear actuator is a lead-screw-type actuator.

* * * * *